United States Patent
Tripp

(10) Patent No.: US 8,943,600 B2
(45) Date of Patent: *Jan. 27, 2015

(54) WEIGHTED SECURITY ANALYSIS

(71) Applicant: International Business Machines Corporation, Armonk, NY (US)

(72) Inventor: Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/661,160

(22) Filed: Oct. 26, 2012

(65) Prior Publication Data

US 2014/0123291 A1    May 1, 2014

(51) Int. Cl.
*G06F 21/00* (2013.01)
*H04L 29/06* (2006.01)
*G06F 21/57* (2013.01)
*G06F 21/60* (2013.01)
*H04L 9/00* (2006.01)

(52) U.S. Cl.
CPC .......... *H04L 63/1433* (2013.01); *G06F 21/577* (2013.01); *H04L 63/14* (2013.01); *G06F 21/604* (2013.01); *H04L 9/002* (2013.01)
USPC ............. 726/25; 717/159; 717/129; 717/124; 717/141; 709/223; 709/224

(58) Field of Classification Search
CPC . H04L 9/002; H04L 63/1433; H04L 63/1408; H04L 63/14; G06F 21/50; G06F 21/604

USPC ................... 726/25; 717/159, 129, 124, 141; 709/223–224
See application file for complete search history.

(56) References Cited

U.S. PATENT DOCUMENTS

| | | | |
|---|---|---|---|
| 7,900,193 B1 | 3/2011 | Kolawa et al. | |
| 2003/0105976 A1* | 6/2003 | Copeland, III | ................ 713/201 |
| 2008/0276228 A1 | 11/2008 | Sreedhar | |
| 2011/0302559 A1 | 12/2011 | Naik | |
| 2012/0011492 A1 | 1/2012 | Sinha et al. | |

OTHER PUBLICATIONS

Yu, Fang;et al; "Generating Vulnerability Signatures for String Manipulating Programs Using Automata-Based Forward and Backward Symbolic Analyses"; Automated Software Engineering, 2009. ASE '09. 24th IEEE/ACM International Conference on DOI: 10.1109/ASE.2009.20 Publication Year: 2009 , pp. 605-609.*

(Continued)

*Primary Examiner* — Hadi Armouche
*Assistant Examiner* — Angela Holmes
(74) *Attorney, Agent, or Firm* — Holland & Knight LLP; Brian J. Colandreo, Esq.; Jeffrey T. Placker, Esq.

(57) ABSTRACT

A method, computer program product, and system for transforming unit tests is described. A unit test associated with one or more software units is identified. A graphical representation of a portion of a computer program is built, wherein the graphical representation includes a control flow edge. A potentially vulnerable data flow associated with the control flow edge is identified. A control flow weight is assigned to the control flow edge, based upon, at least in part, identifying the potentially vulnerable data flow. A security analysis is applied to the portion of the computer program based upon, at least in part, the control flow weight.

14 Claims, 3 Drawing Sheets

(56) References Cited

OTHER PUBLICATIONS

Chong et al., "Secure Web Applications Via Automatic Partitioning," SOSP '07, Oct. 14-17, 2007, pp. 1-14.

Xie et al., "ARCHER: Using Symbolic, Path-Sensitive Analysis to Detect Memory Access Errors," ESEC/FSE '03, Sep. 1-5, 2003, pp. 327-336.

Shahriar et al., Mitigating and Monitoring Program Security Vulnerabilities, Technical Report No. 2010-572, School of Computing, Queen's University, Kingston, Canada, Jun. 2010, pp. 1-161.

Tramontana, "Reverse Engineering of Web Applications," Universita Degli Studi Di Napoli Federico II, Department of Information and Science, 21st IEEE International Conference on Software Maintenance (ICSM'05), Sep. 2005, pp. 1-161.

Xu, "A Model-Based Approach to Test Generation for Aspect-Oriented Programs," Submission to AOSD '2005 Workshop on Testing AOP, pp. 1-6.

Singer, "Twards Probabilistic Program Slicing," Dagstuhl Seminar Proceedings 05451, Beyond Program Slicing; http://drops.dagstuhl.de/opus/volltexte/2006/485, pp. 1-14.

McCamant et al., "Quantitative Information Flow as Network Flow Capacity," PLDI'08, Jun. 7-13, 2008, pp. 1-13.

Reps et al., "Precise Interprocedural Dataflow Analysis Via Graph Reachability," University of Wisconsin, POPL '95 Proceedings of the 22nd ACM SIGPLAN-SIGACT symposium on Principles of programming languages pp. 49-61.

\* cited by examiner

WEIGHTED SECURITY ANALYSIS

TECHNICAL FIELD

This disclosure relates to security testing of software.

BACKGROUND

Use of software that is vulnerable to attack or other exploitation may, for example, subject individuals and/or organizations to costly liability, loss, and other undesirable consequences. Accordingly, in software development and analysis it may be useful to determine whether particular software units (e.g., modules, algorithms, processes, and so on) may be vulnerable to malicious attacks. Complete security analysis may require analysis, in certain software, of millions of lines of code.

BRIEF SUMMARY OF THE DISCLOSURE

According to one aspect of the disclosure, a computer-implemented method includes building, by one or more computing devices, a graphical representation of a portion of a computer program, wherein the graphical representation includes a control flow edge. The method further includes identifying, by the one or more computing devices, a potentially vulnerable data flow associated with the control flow edge. The method further includes assigning, by the one or more computing devices, a control flow weight to the control flow edge, based upon, at least in part, identifying the potentially vulnerable data flow. The method further includes applying, by the one or more computing devices, a security analysis to the portion of the computer program based upon, at least in part, the control flow weight.

One or more of the following features may be included. Identifying the potentially vulnerable data flow may include identifying one or more sink statements associated with the computer program. Identifying the potentially vulnerable data flow may include determining one or more backward transitive closures of the one or more sink statements. Assigning the control flow weight to the control flow edge may include assigning one or more security risk weights to the one or more sink statements. Assigning the control flow weight to the control flow edge may include determining a number of the one or more sink statements that are associated with the control flow edge based upon, at least in part, the backward transitive closure. Assigning the control flow weight to the control flow edge may include determining an aggregate weighted security risk associated with the number of sink statements based upon, at least in part, the one or more security risk weights. Assigning the control flow weight to the control flow edge may include determining an uncertainty level associated with the control flow edge.

The method may further include determining the control flow weight based upon, at least in part, the uncertainty level. Assigning the control flow weight may be based upon, at least in part, a predefined specification. Identifying the one or more sink statements may be based upon, at least in part, a predefined specification. Assigning one or more security risk weights to the one or more sink statements may be based upon, at least in part, a predefined specification.

According to another aspect of the disclosure, a computer program product resides on a computer readable storage medium and has a plurality of instructions stored on it. When executed by a processor, the instructions cause the processor to perform operations including building a graphical representation of a portion of a computer program, wherein the graphical representation includes a control flow edge. The operations further include identifying a potentially vulnerable data flow associated with the control flow edge. The operations further include assigning a control flow weight to the control flow edge, based upon, at least in part, identifying the potentially vulnerable data flow. The operations further include applying a security analysis to the portion of the computer program based upon, at least in part, the control flow weight.

One or more of the following features may be included. Identifying the potentially vulnerable data flow may include identifying one or more sink statements associated with the computer program. Identifying the potentially vulnerable data flow may include determining one or more backward transitive closures of the one or more sink statements. Assigning the control flow weight to the control flow edge may include assigning one or more security risk weights to the one or more sink statements. Assigning the control flow weight to the control flow edge may include determining a number of the one or more sink statements that are associated with the control flow edge based upon, at least in part, the backward transitive closure. Assigning the control flow weight to the control flow edge may include determining an aggregate weighted security risk associated with the number of sink statements based upon, at least in part, the one or more security risk weights. Assigning the control flow weight to the control flow edge may include determining an uncertainty level associated with the control flow edge.

The operations may further include determining the control flow weight based upon, at least in part, the uncertainty level. Assigning the control flow weight may be based upon, at least in part, a predefined specification. Identifying the one or more sink statements may be based upon, at least in part, a predefined specification. Assigning one or more security risk weights to the one or more sink statements may be based upon, at least in part, a predefined specification.

According to another aspect of the disclosure, a computing system includes one or more processor and one or more memory architecture coupled with the at one or more processors. The one or more processors are configured to build a graphical representation of a portion of a computer program, wherein the graphical representation includes a control flow edge. The one or more processors are configured to identify a potentially vulnerable data flow associated with the control flow edge. The one or more processors are configured to assign a control flow weight to the control flow edge, based upon, at least in part, identifying the potentially vulnerable data flow. The one or more processors are configured to apply a security analysis to the portion of the computer program based upon, at least in part, the control flow weight.

One or more of the following features may be included. Identifying the potentially vulnerable data flow may include identifying one or more sink statements associated with the computer program. Identifying the potentially vulnerable data flow may include determining one or more backward transitive closures of the one or more sink statements. Assigning the control flow weight to the control flow edge may include assigning one or more security risk weights to the one or more sink statements. Assigning the control flow weight to the control flow edge may include determining a number of the one or more sink statements that are associated with the control flow edge based upon, at least in part, the backward transitive closure. Assigning the control flow weight to the control flow edge may include determining an aggregate weighted security risk associated with the number of sink statements based upon, at least in part, the one or more security risk weights. Assigning the control flow weight to the control flow edge may include determining an uncertainty level associated with the control flow edge.

The one or more processors may be configured to determine the control flow weight based upon, at least in part, the uncertainty level. Assigning the control flow weight may be based upon, at least in part, a predefined specification. Identifying the one or more sink statements may be based upon, at least in part, a predefined specification. Assigning one or more security risk weights to the one or more sink statements may be based upon, at least in part, a predefined specification.

According to another aspect of the disclosure, a computer-implemented method includes building, by one or more computing devices, a graphical representation of a portion of a computer program, wherein the graphical representation includes a control flow edge. The method further includes identifying, by the one or more computing devices, a potentially vulnerable data flow associated with the control flow edge. The method further includes assigning, by the one or more computing devices, a control flow weight to the control flow edge, based upon, at least in part, identifying the potentially vulnerable data flow. Assigning the control flow weight is based upon, at least in part identifying, by the one or more computing devices, the potentially vulnerable data flow. Assigning the control flow weight is based upon, at least in part determining, by the one or more computing devices, an uncertainty level associated with the control flow edge. Assigning the control flow weight is based upon, at least in part determining, by the one or more computing devices, the control flow weight based upon, at least in part, the uncertainty level. The method further includes applying, by the one or more computing devices, a security analysis to the portion of the computer program based upon, at least in part, the control flow weight.

The details of one or more implementations are set forth in the accompanying drawings and the description below. Other features and advantages will become apparent from the description, the drawings, and the claims.

BRIEF DESCRIPTION OF THE SEVERAL VIEWS OF THE DRAWINGS

Like reference symbols in the various drawings indicate like elements.

DETAILED DESCRIPTION OF THE PREFERRED EMBODIMENTS

Figure 1:
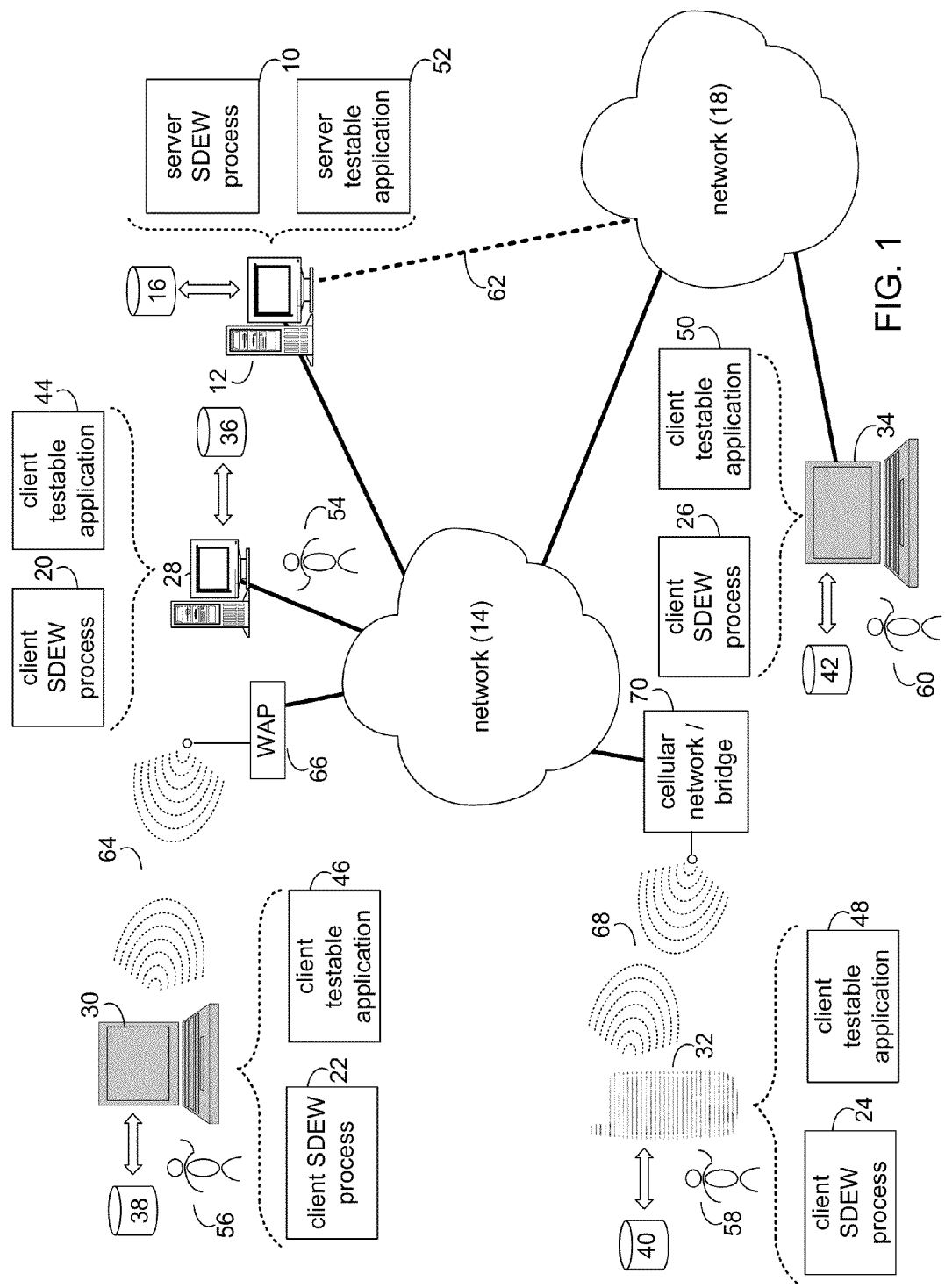
FIG. 1 is a diagrammatic view of a security-directed edge weighting process coupled to a distributed computing network.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program coded embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Various types of software may be vulnerable to various types of malicious attacks. In the case of software including a web application, for example, software may be vulnerable to a variety of attack types, including SQL injection, impersonation, buffer overflow, URL interpretation, input validation, and so on. Such attacks can lead to various types of loss, risks of loss and other issues for both individuals and organizations. For example, an attack on a web application may result in disclosure of proprietary or otherwise protected information, or execution of a variety of malicious commands by a web server or other computing device.

In software development and analysis it may be useful, therefore, to test particular software and software units (e.g., modules, algorithms, processes, and so on) for one or more security vulnerabilities. One issue with such testing, however, is that it may be both time consuming and expensive. For example, modern programs may include millions (or even tens of millions) of lines of code and may therefore not be amenable to exhaustive scanning in realistic timeframes and/or at realistic costs.

Static analysis (or static program analysis) may be a form of analysis of software units that does not require actual execution of the software units. In certain embodiments, static analysis may represent a less expensive method of evaluating security vulnerabilities than other methods (e.g., dynamic testing). Exhaustive static analysis may not be appropriate in certain cases, however. For example, certain static analysis algorithms may exhibit polynomial or even exponential complexity, and therefore may need to be executed subject to various bounds in order to allow feasible/affordable security analysis to progress. Various bounding heuristics may be employed by security scanners such as bounding the run-time or iteration cycles of an analysis, bounding a call-graph representation of a software application on which the analysis is based so that only a portion of the application is represented, bounding the number of data propagation steps, bounding the number of paths reported regarding a specific vulnerability, and so on. At least two undesirable consequences may flow from these (and/or other) heuristics, however. First, due to the bounding there is a risk that serious security vulnerabilities will not be identified. Second, the bounded analysis behavior may be unpredictable. For example, in certain embodiments, including a new method in the target scope of a security scan that is limited by such heuristics (or other bounding) may result in the scan missing previously-identified security issues because the scan must re-allocate a portion of its limited "budget" to analyzing the new method.

In some embodiments, a security-directed edge weighting ("SDEW") process may address these and other issues by optimizing bounded static security analyses to facilitate better utilization of a limited budget, and/or to otherwise increase the efficiency of security analysis. For example, an SDEW process may execute a preliminary scanning operation whereby a relatively coarse (e.g., based on a cheap and scalable abstraction) static analysis (or other analysis) of a control-flow structure of a target program may be utilized to determine weights for control-flow edges of the control-flow structure. An SDEW may further apply subsequent security analysis that may track control flows throughout the program (e.g., by traversing a graph of the control-flow structure) in accordance with these determined weights, thereby biasing the analysis toward more relevant portions of the program (from a security standpoint). For example, the traversal of various aspects of the graph may be prioritized based on the determined weights.

In other words, rather than exploring a target software application in an unguided manner and thus potentially making poor use of a limited scanning budget, an SDEW process may allow security scanning to make near-optimal use of a limited budget by focusing analysis of areas of the program that are likely to contain security vulnerabilities. This may result in a variety of benefits. For example, an SDEW process may facilitate significant scalability improvements of security scanning based on targeting later scanning operations toward portions of the code that are more likely to be problematic. As such, an SDEW process may facilitate a more efficient and thorough identification of security issues.

Referring now to FIG. 1, an SDEW process may be coupled to a computer or computer network. For example, server SDEW process 10 may reside on and may be executed by server computer 12, which may be connected to network 14 (e.g., the Internet or a local area network). Examples of server computer 12 may include, but are not limited to: a personal computer, a server computer, a series of server computers, a mini computer, and/or a mainframe computer. Server computer 12 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server SDEW process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft® IIS, Novell® Web Server™, or Apache® Web Server, that allows for access to server computer 12 (via network 14) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.) Network 14 may be connected to one or more secondary networks (e.g., network 18), examples of which may include but are not limited to: a local area network; a wide area network; or an intranet, for example.

Client SDEW processes 20, 22, 24, 26 may reside on and may be executed by client electronic devices 28, 30, 32, and/or 34 (respectively), examples of which may include but are not limited to personal computer 28, laptop computer 30, a data-enabled mobile telephone 32, notebook computer 34, personal digital assistant (not shown), smart phone (not shown) and a dedicated network device (not shown), for example. Client electronic devices 28, 30, 32, 34 may each be coupled to network 14 and/or network 18 and may each execute an operating system, examples of which may include but are not limited to Microsoft® Windows®, Microsoft Windows CEO, Red Hat® Linux®, or a custom operating system.

The instruction sets and subroutines of client SDEW processes 20, 22, 24, 26, which may be stored on storage devices 36, 38, 40, 42 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Storage devices 36, 38, 40, 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

In an embodiment, the SDEW process may be a server-side process (e.g., which may be implemented via server SDEW process 10), in which all of the functionality of the SDEW process may be executed on a server computer (e.g., server computer 12). In an embodiment, the SDEW process may be a client-side process (e.g., which may be implemented via one or more of client SDEW processes 20, 22, 24, 26), in which all of the functionality of the SDEW process may be executed on a client computing device (e.g., one or more of client electronic devices 28, 30, 32, 34). In an embodiment, the SDEW process may be a hybrid server-client process (e.g., which may be implemented by server SDEW process 10 and one or more of client SDEW processes 20, 22, 24, 26), in which at least a portion of the functionality of the SDEW process may be implemented via server computer 12 and at least a portion of the functionality of the SDEW process may be implemented via one or more client computing devices (e.g., one or more of client electronic devices 28, 30, 32, 34).

In certain embodiments, an SDEW process may be a stand-alone process. In certain embodiments, an SDEW process may operate as part of, or in conjunction with, one or more other processes and/or may include one or more other processes. For example, in certain embodiments, an SDEW process may be included in (or may operate in conjunction with) a commercial security analysis product. For example, an SDEW process may be include in a product such as Rational AppScan® or Rational® Application Developer. (Rational and Appscan are registered trademarks of International Business Machine Corp. in the United States, other countries, or both.)

A testable application (or process) may operate (and/or reside) on a client device (e.g., client testable application 44, operating on client electronic device 28; client testable application 46, operating on client electronic device 30; client testable application 48, operating on client electronic device 32; or client testable application 50, operating on client electronic device 34). A client SDEW process (e.g., client SDEW process 20) or a server SDEW process (e.g., server SDEW process 10) may be in communication with a client testable application (e.g., client testable application 44) or may be part of a client testable application.

A testable application may additionally or alternatively operate (and/or reside) on a server device (e.g., server testable application 52, operating on server computer 12 or another server testable application (not shown), operating on another server computer (not shown)). A server SDEW process (e.g., server SDEW process 10) or a client SDEW process (e.g., client SDEW process 20) may be in communication with a server testable application (e.g., server testable application 52) or may be a part of a server testable application.

A testable application (or process) may be any sort of program, process, or application that may be tested for security-related vulnerability. For example, in one embodiment, a testable application (e.g., server testable application 52) may be a web application or process. A web application may, for example, provide various functionality to users or moderators of web sites or web services. A web application may be a front-end application, providing, for example, one or more aspects of a graphical user interface rendered to users or moderators of a web site or web service. A web application may be a back-end application, providing, for example, a process or series of processes that implement (in whole or in part) functional aspects of a web site or web service. In some embodiment, a testable application (e.g., server testable application 52) may be a different type of application or process.

Users 54, 56,58, 60 may access an SDEW process in various ways. For example, these users may access server SDEW process 10 directly through the device on which a client process (e.g., client SDEW processes 20, 22, 24, 26) is executed, namely client electronic devices 28, 30, 32, 34. Users 54, 56,58, 60 may access server SDEW process 10 directly through network 14 and/or through secondary network 18. Further, server computer 12 (i.e., the computer that executes server SDEW process 10) may be connected to network 14 through secondary network 18, as illustrated with phantom link line 62. Users 54, 56,58, 60 may also access a client or server testable application in similar ways.

The various client electronic devices may be directly or indirectly coupled to network 14 (or network 18). For example, personal computer 28 is shown directly coupled to network 14 via a hardwired network connection. Further, notebook computer 34 is shown directly coupled to secondary network 18 via a hardwired network connection. Laptop computer 30 is shown wirelessly coupled to network 14 via wireless communication channel 64 established between laptop computer 30 and wireless access point ("WAP") 66, which is shown directly coupled to network 14. WAP 66 may be, for example, an IEEE 802.11a, 802.11b, 802.11g, 802.11n, Wi-Fi, and/or Bluetooth device that is capable of establishing wireless communication channel 64 between laptop computer 30 and WAP 66. Data-enabled mobile telephone 32 is shown wirelessly coupled to network 14 via wireless communication channel 68 established between data-enabled mobile telephone 32 and cellular network/bridge 70, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

For the following discussion, client SDEW process 20 will be described for illustrative purposes. It will be understood that client SDEW process 20 may, for example, interact and/or communicate with a server SDEW process such as server SDEW process 10 and/or may be executed within one or more applications that allow for communication with other server and/or client SDEW processes. SDEW process 20 may be utilized to test a variety of server and/or client testable applications, such as client testable application 44 or server testable application 52. This is not intended to be a limitation of this disclosure, as other configurations are possible (e.g., SDEW process 20 may include stand-alone client processes and/or stand-alone server processes; SDEW process may be utilized to test client testable application 46, 48, 50 or another server testable application or applications (not shown).) For example, some implementations may include one or more of client SDEW processes 22, 24, 26 or server SDEW process 10 in place of or in addition to client SDEW process 20.

Figure 2:
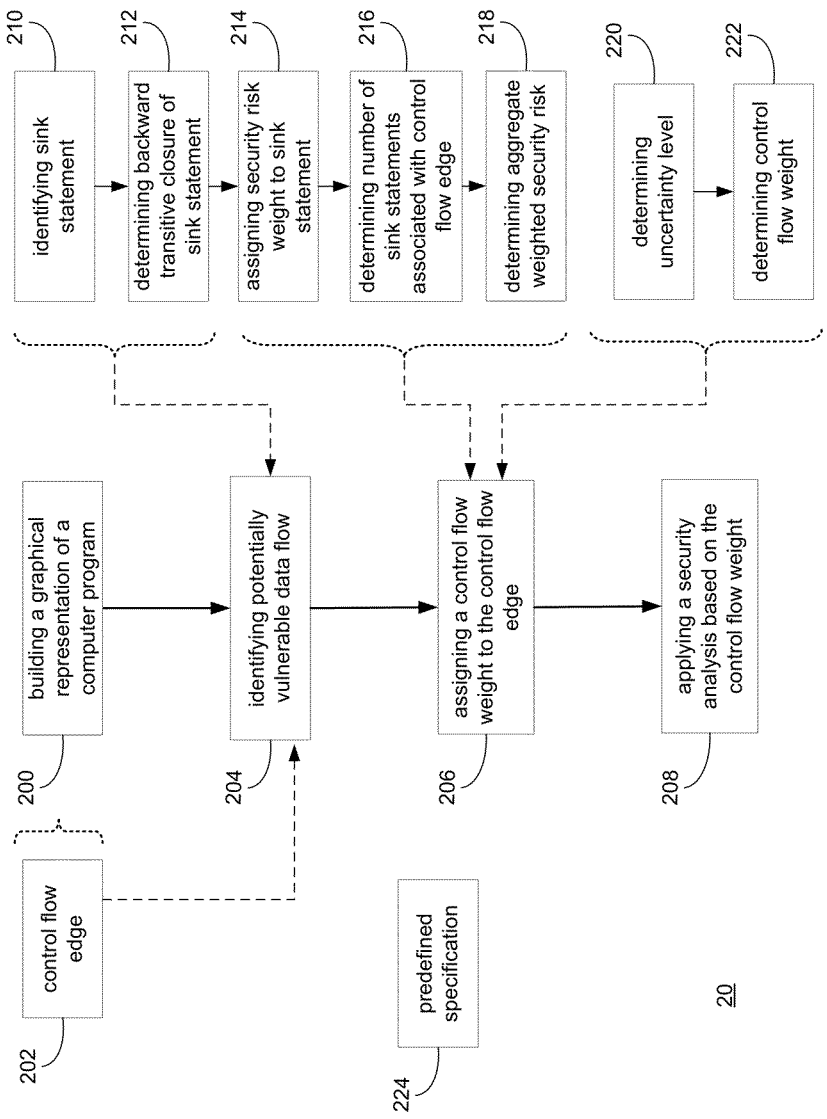
FIG. 2 is a flowchart of a process executed by the security-directed edge weighting process of FIG. 1.

Referring now also to FIG. 2, there is shown a diagrammatic view of an example process that may be implemented by a SDEW process, e.g., client SDEW process 20. Client SDEW process 20 may build 200 a graphical representation of a portion of a computer program. A graphical representation of a computer program may represent various aspects of the computer program in graphical form. In one embodiment, a graphical representation may include an integrated control flow graph (an "ICFG"). An ICFG may, for example, represent, using graph notation, all of the paths potentially traversed by a program during its execution. For example, an ICFG may represent as nodes of the graph one or more blocks of code (e.g., one or more code statements representing one or more particular function) that do not include any jumps or jump targets. Edges in a graph (e.g., edges in an ICFG)—also referred to as "control flow edges" or "flow edges," (e.g., control flow edge 202)—may represent jumps in the code, or flow of data from one block of code to another. SDEW process 20 may build 200 a graphical representation (e.g., an ICFG) using a variety of known techniques and/or applications. In certain embodiments, SDEW process 20 may build 200 a graphical representation (e.g., an ICFG) based on a graphical representation that has been previously generated by a separate process.

SDEW process 20 may identify 204 a potentially vulnerable data flow associated with edge 202 (and/or one or more other edges). A data flow may represent the "path" over which data travels during execution of a program—i.e., a representation of where data comes from and where it goes with respect to functional blocks (or other aspects) of the subject software program. In certain embodiments, such data flow may be associated with a particular edge (or edges) of a graphical representation of a program (e.g., edge 202). Accordingly, SDEW process 20 may identify 204 data flows associated with an edge, for example, by traversing a graphical representation and identifying 204 particular edges associated with particular data flows. In certain embodiments, potentially vulnerable data flows may be data flows in which data from a source statement (e.g., an input into the program) reaches a sink statement (e.g., a location in which data from a source is used in a particular way by the program) without first passing through a downgrader (e.g., an operation that verifies, sanitizes, or otherwise institutes one or more protective operations regarding the data).

As noted above, in certain embodiments, SDEW process 20 may implement multiple rounds of security analysis, in which a first round includes a relatively coarse analysis. As such, in certain embodiments, SDEW process 20 may identify 204 a potentially vulnerable data flow using a coarse analysis. For example, using the built 200 graphical representation, SDEW process 20 may identify 204 as potentially vulnerable data flows one or more instances (e.g., all instances) in which data may flow from a source to a sink, without determining whether such data or may flow through a downgrader. In other words, in certain embodiments, SDEW process 20 may identify 204 an instance in which data flows from a source to a sink as a potentially vulnerable data flow regardless of whether the data flows through a downgrader (and, in some embodiments, without determining whether the data flows through a downgrader).

The built 200 graphical representation may facilitate identifying 204 potentially vulnerable data flows, for example, by providing a representation of sinks and sources (and other operations and/or functionality) as nodes of the graphical representation and a representation of data flows as control flow edges. Accordingly, in certain embodiments, SDEW process may identify 204 potentially vulnerable data flows by traversing a graphical representation in order to identify control flow edges that connect (directly or indirectly) sources to sinks.

In certain embodiments, SDEW process 20 may identify 204 potentially vulnerable data flows (i.e., instances of data flowing from one or more sources to one or more sinks), in a manner that may be further refined with respect to certain types of sources and/or sinks. For example, particular types of sources and/or sinks may be determined to represent input and/or functionality that may be less vulnerable to particular security issues whereas other types of sources and/or sinks may be determined to represent input and/or functionality that may be more vulnerable to particular security issues. Accordingly, in certain embodiments, SDEW process 20 may identify 204 potentially vulnerable data flows (e.g., based on a graphical representation) as including data flows between certain sources and sinks (e.g., those determined to be more vulnerable) but not data flows between other sources and sinks (e.g., those determined to be less vulnerable).

SDEW process 20 may assign 206 a control flow weight to edge 202 based, for example, on identifying 204 the potentially vulnerable data flow. As noted above, it may be useful to conduct security analysis in a way that focuses on data flows that are more likely to implicate security issues. As such, it may be useful to assign a weight to data flows that may be more likely to implicate security issues, which weight may be utilized to appropriately bias subsequent security analysis. Further, because SDEW process 20 may identify 204 potentially vulnerable data flows based on a graphical representation, one or more edges of the graphical representation may be associated with a particular identified 204 flow. Accordingly, in certain embodiments, SDEW process 20 may assign 206 particular weights to particular control flow edges, based on whether the data flow(s) associated with those control flow edges may be potentially vulnerable data flows. In certain embodiments, assigned 206 control flow weights may vary across different control flow edges. For example, a control flow edge associated with a more serious potential vulnerability, a particular type of security issue, a particular type of sink and/or source, and so on may be assigned 206 a larger control flow weight than a control flow edge that is not (or is less) associated with such potential vulnerability, type of security issue, type of sink and/or source, and so on.

SDEW process 20 may assign 206 control flow weights in a variety of ways. For example, because a program may include a variety of sources and sinks, a particular control flow edge may be associated with a variety of data flows, and therefore may be associated with a variety of potentially vulnerable data flows. As such, for example, SDEW process 20 may assign 206 a control flow weight to a particular edge representing the total number of potentially vulnerable data flows with which the edge may be associated, the proportion of the total potentially vulnerable data flows of the entire program with which the edge may be associated, a representation of the likelihood that a data flow associated with the edge is a potentially vulnerable data flow, and so on. In certain embodiments, SDEW process 20 may assign 206 a control flow weight representing a weighted sum of all sinks reachable from a control location (i.e., a graph node) that is a target of the edge. In certain embodiments, an assigned 206 control flow weight may represent whether (in addition/as an alternative to, for example, how much) data flows from a source statement to locations of interest (e.g., sink statements).

As noted above, SDEW process 20 may build 200 a graphical representation based upon a previously-generated graphical representation, and may accordingly assign 206 control flow weights to edges included in a previously-generated graphical representation of a software program. For example, SDEW process 20 may build 200 a modified graphical representation including the assigned 206 control flow weights. For example, if SDEW process 20 assigns 206 control flow weights to edges in an ICFG, SDEW process 20 may be viewed as building 200, as a result, a weighted ICFG ("WICFG") including the assigned 206 control flow weights.

SDEW process 20 may apply 208 a security analysis to a portion of a computer program based upon, for example, the assigned 206 control flow weight(s). Security analysis may be an analysis of a software program (or program portion) directed to identifying potential security-related vulnerabilities (e.g., vulnerability to malicious attack) and/or other security-related issues. As noted above, in certain embodiments, security analysis may be directed to identifying data flows from a source to a sink that do not pass through a downgrader. In order, for example, to focus security analysis (e.g., because of a finite budget for the analysis and a large code base to be analyzed) SDEW process 20 may cause the focus of a security analysis be biased based on assigned 206 control flow weights. For example, in certain embodiments SDEW process 20 may control the priority of portions of a program to be analyzed (e.g., in a priority queue) based on the control flow weight assigned 206 to particular control flow edges. For example, SDEW process 20 may apply 208 a security analysis to code portions associated with control flow edges that have been assigned 206 higher control flow weights (e.g., which may represent a relatively higher degree and/or number of potentially vulnerable data flows) before applying 208 the security analysis to code portions associated with control flow edges that have been assigned 206 lower control flow weights (e.g., which may represent a relatively lower degree and/or number of potentially vulnerable data flows). In this way, for example, a security analysis with a limited budget may be focused on portions of a program that are more likely to include security vulnerabilities. Other configurations may also be possible. For example, the assigned 206 control flow weights may influence the allocation of an analysis budget (e.g., the allocation of time or computing resources) to various portions of a program, whether a control flow edge is traversed at all as part of the security analysis (i.e., control flow edges with zero or negative weight may be excluded from the analysis), and so on.

Identifying 204 the potentially vulnerable data flow may include identifying 210 a sink statement and determining 212 a backward transitive closure of the identified 210 sink statement. A backward transitive closure may be an analysis, starting from an identified 210 sink statement that identifies source statements (e.g., each source statement) and control flows (e.g., each control flow) from or through which a data flow of the program may reach the sink statement. This may be useful, for example, because it may facilitate identifying 204 potentially vulnerable data flows through the identification of data flows that reach from various sources to a particular sink.

Assigning 206 the control flow weight may include assigning 214 a security risk weight to one or more identified 210 sinks. For example, a particular type of sink may represent a greater security risk (e.g., may be more exploitable or associated with a more severe/prevalent risk type) and/or may represent a security risk of greater relevance to a particular scan than may another type of sink. As such, it may be useful to assign 214 a greater security risk weight to a sink of that particular type of sink to indicate that the sink may be more relevant to a particular security scan.

In certain embodiments, a large number of sinks associated with a particular edge (e.g., edge 202) may indicate that the edge may be particularly likely to be relevant to security analysis. This may be particularly true, for example, if the large number of sinks are also associated with potentially vulnerable data flows associated with a particular edge. Accordingly, for example, in certain embodiments it may be useful to assign 206 a greater control flow weight to the particular edge associated with a larger number of sinks (or sinks of a particular type) and/or a larger number of potentially vulnerable security flows than a control flow weight that is assigned 206 to other edges associated with a smaller number of sinks (or sinks of a particular type) and a smaller number of potentially vulnerable security flows. In other words, for example, it may be useful in certain embodiments to assign 206 a greater control flow weight to an edge associated with a control flow (e.g., a potentially vulnerable control flow) that is associated with a sink (or sinks) that has been assigned 214 a greater security risk weight. Accordingly, in certain embodiments SDEW process 20 may determine 216 a number of identified 210 sink statements that are associated with a particular control flow edge.

For example, based on determining 212 a backward transitive closure for multiple sinks, SDEW 20 may determine 216 that a particular number of sinks are all associated with the same (or related) control flow edge(s). SDEW process 20 may then, for example, determine 218 an aggregate weighted security risk associated with the determined 216 number of identified 210 sink statements. For example, if a number of identified 210 sinks associated with control flow edge 202 have been assigned 214 various security risk weights, SDEW process 20 may determine 218 an aggregated weighted security risk based on, at least in part, a sum, an average, a weighted average, and/or another combination, of the various security risk weights of the identified 210 sinks. A control flow weight may then be assigned 206 to control edge 202 based on the determined 218 aggregated weighted security risk. As such, for example, SDEW process 20 may assign 206 a control flow weight to a first flow edge that is higher than a control flow edge assigned 206 to a second flow edge because the determined 218 aggregated weighted security risk associated with the first flow edge is larger than the aggregated weighted security risk associated with the second flow edge (e.g., because the sinks associated with data flows associated with the first edge are greater in number and/or have been assigned 214 higher security risk weights than the sinks associated with data flows associated with the second edge).

In certain embodiments, various sinks associated with a control flow edge may not bear equally on the determined 218 aggregate weighted security risk upon which the edge's assigned 206 control flow weight may be based. For example, in certain embodiments, sinks assigned 214 particularly low security risk weights may be ignored in determining 218 aggregated weighted security risk. Similarly, in certain embodiments, security risk weights may be modulated by various functions (e.g., floor functions, ceiling functions, decay functions, and so on) so that certain sinks (e.g., sinks with certain security risk weights) may factor more or less prominently in the determined 218 aggregate weighted security risk.

Assigning 206 a control flow weight to control flow edge 202 may include determining 220 an uncertainty level associated with control flow edge 202. For example, in certain embodiments it may be useful to focus security analysis on control flow edges that are more likely to be involved in actual flow of data in the execution of the program (as opposed, for example, to edges that may be utilized only rarely). As such, SDEW process 20 may analyze a program (e.g., through static analysis or other analysis techniques) in order to identify data flows (and, accordingly, control flow edges) that are more (or less) likely to be actually implemented as part of runtime data flows. For example, SDEW process 20 may identify that a particular data flow (associated with a particular flow edge) occurs during operation of a program only if a large number of nested (or other) conditional statements (or other uncertain operations) are satisfied. Accordingly, it may be less likely that such a flow edge (as opposed, for example, to a flow edge not associated with significant conditionality) may be implicated in the actual execution of the program. Accordingly, SDEW process 20 may determine 220 that such a control flow edge has a higher uncertainty level, which may result in SDEW process 20 determining 222 a lower control flow weight to be assigned 206 to that edge. SDEW process 20 may determine 220 an uncertainty level using a variety of known techniques.

In certain embodiments, SDEW process 20 may implement various processes or functionality based on predefined specification 224. Predefined specification 224 may, for example, include a table, list or other data record created, maintained, and/or accessed by a user or administrator of SDEW process 20 and/or of a testable application. In certain embodiments, for example, assigning 206 a control flow weight may be based in part on preferences included in predefined specification. For example, predefined specification 224 may indicate that the planned security analysis will focus (or not focus) on a particular set of control flow types, a particular type of security vulnerability (e.g., vulnerability to a particular type of malicious attack), or other particular parameter(s). As such, based on predefined specification 224, SDEW process 20 may assign 206 higher (or lower) control flow weights to particular types of control flow edges, control flow edges associated with a particular type of security vulnerability, control flow edges associated particular types (and/or numbers) of sources and/or sinks, and so on.

In certain embodiments, identifying 210 a sink statement, assigning 214 security risk weights to sink statements, determining 218 aggregate weighted security risks, and/or other functionality may be based on predefined specification 224. For example, predefined specification 224 may designate particular types of sink (or source) statements to be included (or excluded) in identifying 210 sink (or source) statements, indicate that a particular type of sink (or source) statement is to be a focus (or not a focus) of a particular security analysis, and/or may indicate that the analysis will focus (or not focus) on a particular type of security vulnerability (e.g., a type associated with a particular type of sink and/or source statement) and/or other particular parameter. As such, based on predefined specification 224, SDEW process 20 may, for example, identify 210 only a particular type of sink statements, may assign 214 particular security risk weights based on the type (or other aspect) of particular sink statements, and/or may determine 218 aggregate weighted security risk associated with the sink statements by assigning more (or less) importance to particular sinks based on the type or other aspect) of the sinks.

As noted above, in certain embodiments, other aspects and/or functionality of SDEW process 20 may be based on predefined specification 224. For example, in certain embodiments, identifying 204 potentially vulnerable data flows may be based on predefined specification 224. For example, predefined specification 224 may indicate that particular types of sinks (or sources) are associated (or likely to be associated) with potential security issues while other types of sinks (or sources) are not associated (or not likely to be associated) with potential security issues. As such, for example, based on predefined specification 224, SDEW process 20 identify 204 potentially vulnerable data flows as including data flows between sources and sinks that (individually or collectively) may be associated with potential security issues but not data flows between sources and sinks that (individually or collectively) may not be associated with potential security issues.

Figure 3:
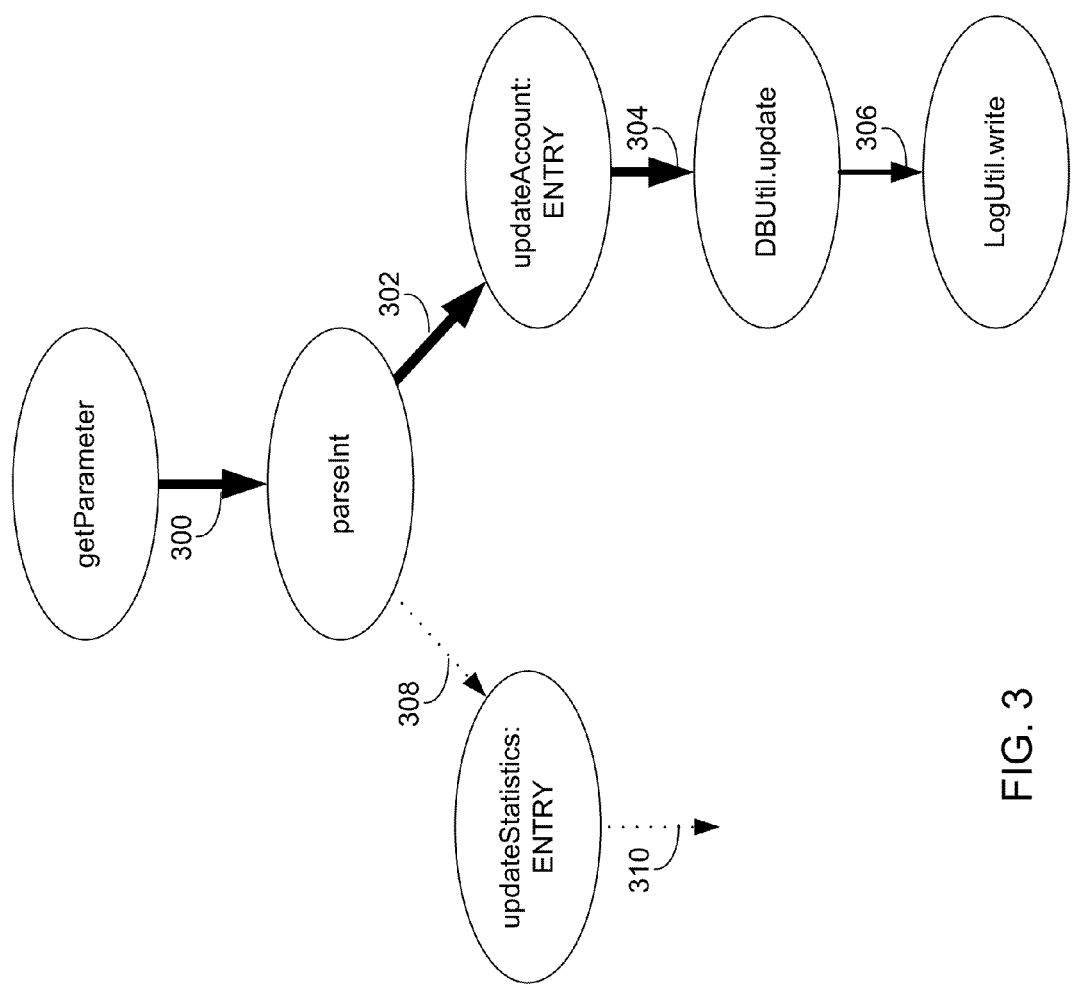
FIG. 3 is a diagrammatic view of an implementation of the security-directed edge weighting process of FIG. 1.

Referring now also to FIG. 3, an example of an implementation of SDEW process 20 is presented. In FIG. 3, an ICFG representation of the following program segment (in Java syntax) is presented:

```
// Public entry point
String username = request.getParameter("name");
int sum = Integer.parseInt(request.getParameter("sum"));
if (*) {
        updateStatistics(username);
} else {
        updateAccount(username, sum);
}
private void updateStatistics(String username) {
    // No security sinks
    ...
}
private void updateAccount(String username, int sum) {
    // Sensitive operation - SQL injection
    DBUtil.update(username, sum);
    // Sensitive operation - log forging
    LogUtil.write(username, sum);
}
```

As is indicated in the ICFG representation in FIG. 3, this program segment may include a variety of sink statements (e.g., DBUtil.update and LogUtil.write, both of which may include security-sensitive operations) and at least one source (e.g., getParameter). In the ICFG of FIG. 3, the data flows between various statements of the program segment (e.g., getParameter, parseInt, updateStatistics, updateAccount, and so on) may be represented by various control flow edges—i.e., control flow edges 300, 302, 304, 306, 308 and 310).

Based on analysis of the ICFG representation in FIG. 3 (as, for example, described in greater detail above), SDEW process 20 may, for example, identify 204 potentially vulnerable data flows associated with various control flow edges (e.g., based on identifying 210 sinks DBUtil.update and LogUtil.write), and may assign 206 particular control flow weights to the various control flow edges, which may bias subsequent security analysis toward analysis of particular edges. For example, based on assigning 206 particular weights to particular control flow edges, SDEW process 20 may apply 208 a security analysis that prioritizes analysis of updateAccount (and its callees), for example, over analysis of updateStatistics. This may be useful to security analysis because, in this example, the identified security-sensitive operations (i.e., DBUtil.update and LogUtil.write) may be reachable via updateAccount but not via updateStatistics, therefore security scanning that prioritizes analysis of updateAccount and/or its callees may more effectively identify relevant potential security issues.

The bias informing such application 208 of a security analysis may be graphically indicated in FIG. 3, for example, by control flow edges 300, 302 and 304 (i.e., control flow edges that forward control toward the sinks DBUtil.update and LogUtil.write) being thicker (i.e., having been assigned 206 a greater control flow weight) than other control flow edges. In certain embodiments, assigned 206 control flow weights may vary among various edges based on various parameters of the analyzed computer program (or program unit) and various methods, operations, and/or configurations of SDEW process 20 (e.g., as specified in predefined specification 224). For example, in FIG. 3, control flow edge 306 is depicted as being less thick than edges 300, 302 and 304, because there is only one sink reachable via edge 306 (i.e., LogUtil.write), rather than two sinks (as with edges 300, 302, and 304) but is illustrated as being thicker than other edges (e.g., edges 308 and 310) through which no (or less relevant) sinks are reachable.

In certain embodiments, as also noted above, an applied 208 security analysis may entirely ignore a particular control flow edge if, for example, that edge has been assigned 206 a particular low (including, e.g., zero or negative) control flow weight. Because SDEW process 20, for example, may have identified 204 no potentially vulnerable data flows associated with updateStatistics (e.g., based on determining 212 backward transitive closures of identified 210 sinks DBUtil.update and LogUtil.write), control flow edges leading to and from updateStatistics (i.e., edges 308 and 310) may be assigned a low, zero or negative weight and may not be traversed by the applied 208 security analysis (or may be traversed with lower priority and/or fewer resources than other edges). This may be indicated, for example, in FIG. 3 by the dotted-line representation of edges 308 and 310. In this way, for example, analysis of the ICFG representation by SDEW process 20 may appropriately bias security analysis of this example program segment in order to efficiently allocate a limited security analysis budget.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of embodiments and implementations have been described. Nevertheless, it will be understood that various modifications may be made. Accordingly, other embodiments and implementations are within the scope of the following claims.

What is claimed is:

1. A computer program product residing on a non-transitory computer-readable storage medium having a plurality of instructions stored thereon, which, when executed by a processor, cause the processor to perform operations comprising:
    building a graphical representation of a portion of a computer program, wherein the graphical representation includes a plurality of control flow edges;
    identifying a potentially vulnerable data flow associated with at least one of the plurality of control flow edges including:
        identifying one or more sink statements associated with the computer program; and
        determining one or more backward transitive closures of the one or more sink statements;
    assigning a control flow weight to each of the plurality of control flow edges, based upon, at least in part, identifying the potentially vulnerable data flow including determining a number of the one or more sink statements that are associated with a control flow edge based upon, at least in part, the backward transitive closure, wherein the control flow weight indicates how likely the potentially vulnerable data flow associated with the control flow edge implicates a security issue, wherein the control flow edge associated with a serious potential vulnerability is assigned a larger control flow weight than other control flow edges; and
    applying a security analysis to the portion of the computer program based upon, at least in part, the control flow weight.

2. The computer program product of claim 1 wherein assigning the control flow weight to each of the plurality of control flow edges comprises:
    assigning one or more security risk weights to the one or more sink statements; and
    determining an aggregate weighted security risk associated with the number of sink statements based upon, at least in part, the one or more security risk weights.

3. The computer program product of claim 1 wherein assigning the control flow weight comprises:
   determining an uncertainty level associated with the control flow edge.

4. The computer program product of claim 3 wherein the operations further comprise:
   determining the control flow weight based upon, at least in part, the uncertainty level.

5. The computer program product of claim 1 wherein assigning the control flow weight is based upon, at least in part, a predefined specification.

6. The computer program product of claim 1 wherein identifying the one or more sink statements is based upon, at least in part, a predefined specification.

7. The computer program product of claim 2 wherein assigning the one or more security risk weights to the one or more sink statements is based upon, at least in part, a predefined specification.

8. A computer system comprising:
   one or more processors; and
   one or more memory architectures coupled with the one or more processors;
   wherein the one or more processors are configured to:
      build a graphical representation of a portion of a computer program, wherein the graphical representation includes a plurality of control flow edges;
      identify a potentially vulnerable data flow associated with at least one of the plurality of control flow edges including:
         identifying one or more sink statements associated with the computer program; and
         determining one or more backward transitive closures of the one or more sink statements;
      assign a control flow weight to each of the plurality of control flow edges, based upon, at least in part, identifying the potentially vulnerable data flow including determining a number of the one or more sink statements that are associated with a control flow edge based upon, at least in part, the backward transitive closure, wherein the control flow weight indicates how likely the potentially vulnerable data flow associated with the control flow edge implicates a security issue, wherein the control flow edge associated with a serious potential vulnerability is assigned a larger control flow weight than other control flow edges; and
      apply a security analysis to the portion of the computer program based upon, at least in part, the control flow weight.

9. The computer system of claim 8 wherein assigning the control flow weight to each of the plurality of control flow edges comprises:
   assigning one or more security risk weights to the one or more sink statements; and
   determining an aggregate weighted security risk associated with the number of sink statements based upon, at least in part, the one or more security risk weights.

10. The computer system of claim 8 wherein assigning the control flow weight comprises:
    determining an uncertainty level associated with the control flow edge.

11. The computer system of claim 10 wherein the one or more processors are further configured to:
    determine the control flow weight based upon, at least in part, the uncertainty level.

12. The computer system of claim 8 wherein assigning the control flow weight is based upon, at least in part, a predefined specification.

13. The computer system of claim 8 wherein identifying the one or more sink statements is based upon, at least in part, a predefined specification.

14. The computer system of claim 9 wherein assigning the one or more security risk weights to the one or more sink statements is based upon, at least in part, a predefined specification.

* * * * *